United States Patent
Hayashi

(10) Patent No.: US 7,822,945 B2
(45) Date of Patent: Oct. 26, 2010

(54) CONFIGURATION MANAGING DEVICE FOR A RECONFIGURABLE CIRCUIT

(75) Inventor: Takeo Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 11/701,385

(22) Filed: Feb. 2, 2007

(65) Prior Publication Data

US 2007/0186218 A1    Aug. 9, 2007

(30) Foreign Application Priority Data

Feb. 6, 2006    (JP)    ............... 2006-027892

(51) Int. Cl.
G06F 15/00    (2006.01)
G06F 15/76    (2006.01)
(52) U.S. Cl. .................................................. 712/34
(58) Field of Classification Search .............. 712/220, 712/34
See application file for complete search history.

(56) References Cited

U.S. PATENT DOCUMENTS

| | | | |
|---|---|---|---|
| 5,206,951 A | | 4/1993 | Khoyi et al. |
| 6,006,319 A | * | 12/1999 | Takahashi et al. ............ 712/34 |
| 6,055,650 A | * | 4/2000 | Christie ...................... 714/39 |
| 6,209,077 B1 | | 3/2001 | Robertson et al. |
| 6,496,740 B1 | * | 12/2002 | Robertson et al. ............ 700/20 |
| 6,901,502 B2 | * | 5/2005 | Yano et al. ................... 712/37 |
| 7,017,033 B2 | * | 3/2006 | Uchino ....................... 712/234 |
| 2003/0028673 A1 | | 2/2003 | Lin et al. |
| 2004/0216122 A1 | | 10/2004 | Gram et al. |
| 2005/0144515 A1 | | 6/2005 | Yano et al. |
| 2007/0174605 A1 | * | 7/2007 | Kamiya et al. ............. 713/100 |

FOREIGN PATENT DOCUMENTS

| | | |
|---|---|---|
| JP | 4-42342 | 2/1992 |
| JP | 11-85608 | 3/1999 |
| JP | 2001-67212 | 3/2001 |
| JP | 2002-530780 A | 9/2002 |
| JP | 2003-208305 | 7/2003 |
| JP | 2004-5110 | 1/2004 |
| JP | 2004-343559 | 12/2004 |
| JP | 2004-362446 | 12/2004 |

(Continued)

OTHER PUBLICATIONS

Hennessy & Patterson, Computer Organization and Design, 1998, Morgan Kaufmann Publishers, pp. 450, 461, 469, 489-491, 499, MIPs appendix.*

(Continued)

*Primary Examiner*—Eddie P Chan
*Assistant Examiner*—Corey Faherty
(74) *Attorney, Agent, or Firm*—McGinn IP Law Group PLLC

(57) ABSTRACT

A semiconductor device including a multi-layer interconnection substrate having a signal distribution interconnection and a power supply line and semiconductor circuit blocks installed on the multi-layer interconnection substrate for performing required operations. The multi-layer substrate includes a third interconnection layer having interconnections extending in a first direction, a second interconnection layer having interconnections extending in a second direction which is different to the first direction, and a first interconnection layer having interconnections extends in a direction orthogonal to the first direction.

16 Claims, 6 Drawing Sheets

FOREIGN PATENT DOCUMENTS

WO     WO 01/90887     11/2001

OTHER PUBLICATIONS

"Product Lineup_64-Bit VR Series", NEC Electronics Corporation, Internet URL: http://www.necel.com/micro/product/vr/vr4133/index.htm, Retrieved on Jul. 28, 2005.

"AES Cipher Engine", Techno Create, Internet URL: http://www.techno-create.com/hot/aes.html, Retrieved on Jul. 28, 2005.

Mollick, Establishing Moore's Law, Jul.-Sep. 2006, IEEE Anals of the History of Computing, IEEE Computing Society, pp. 62, 70.

U.S. Office Action dated Aug. 17, 2009 in U.S. Appl. No. 11/620,419.

* cited by examiner

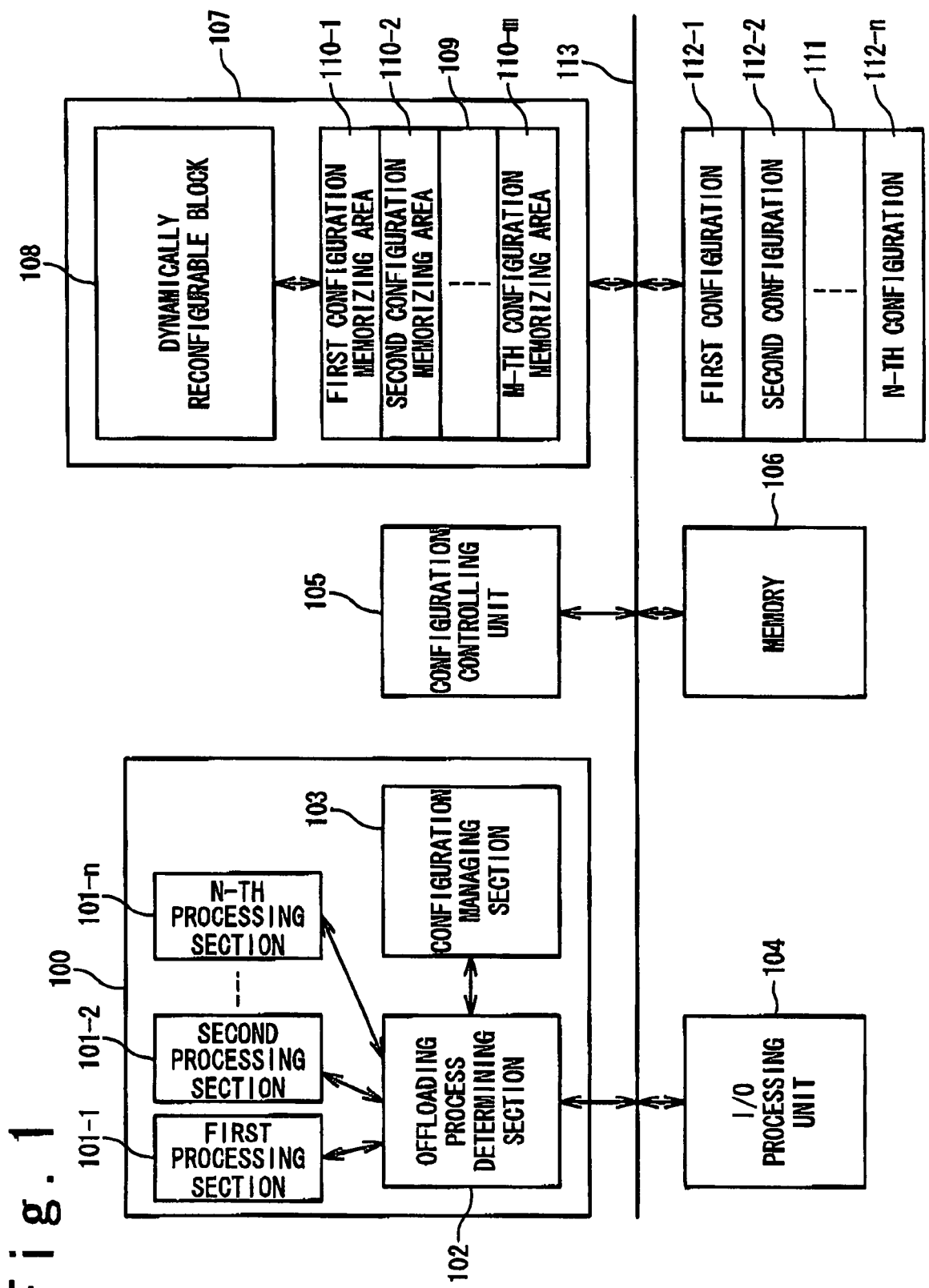

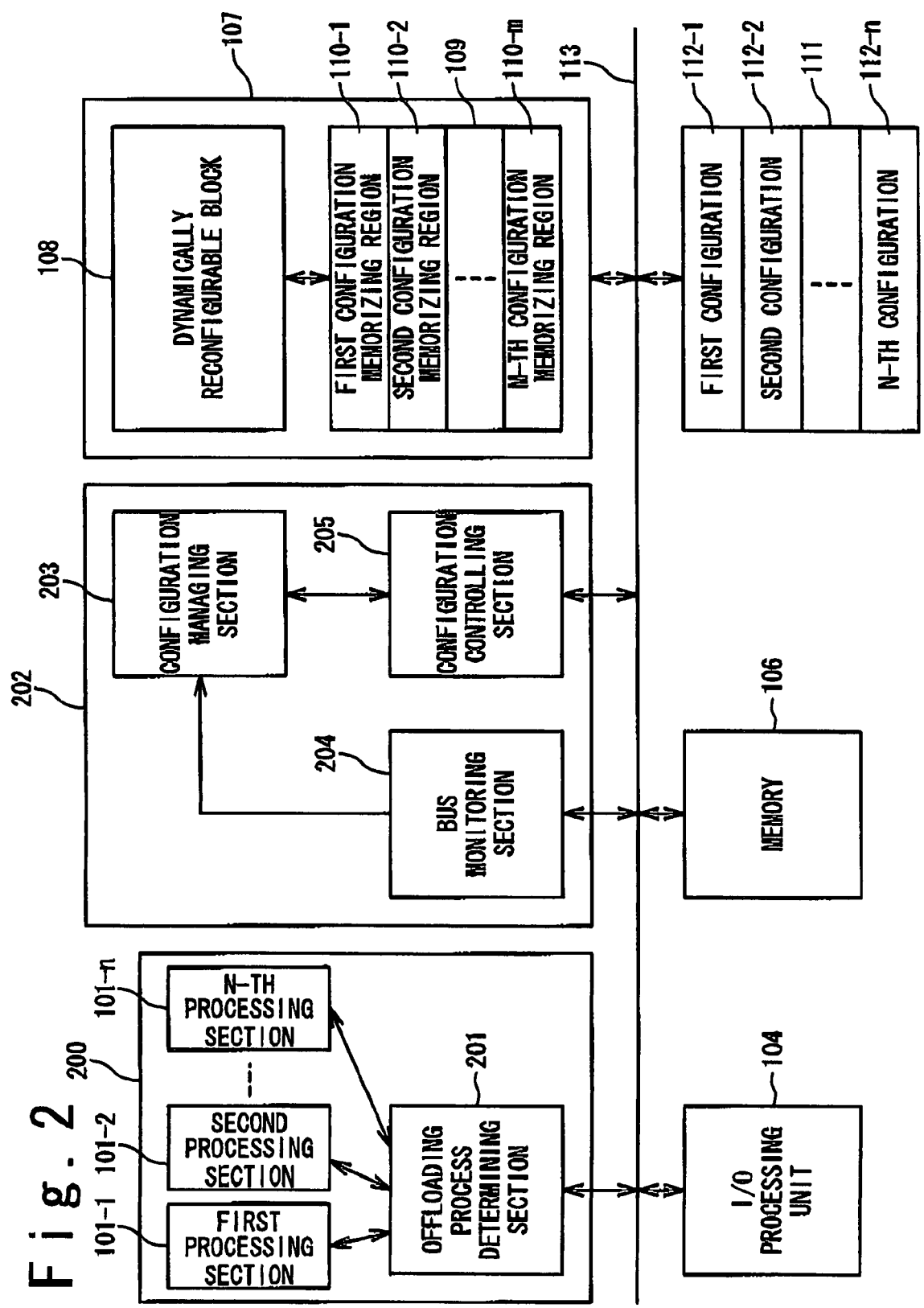

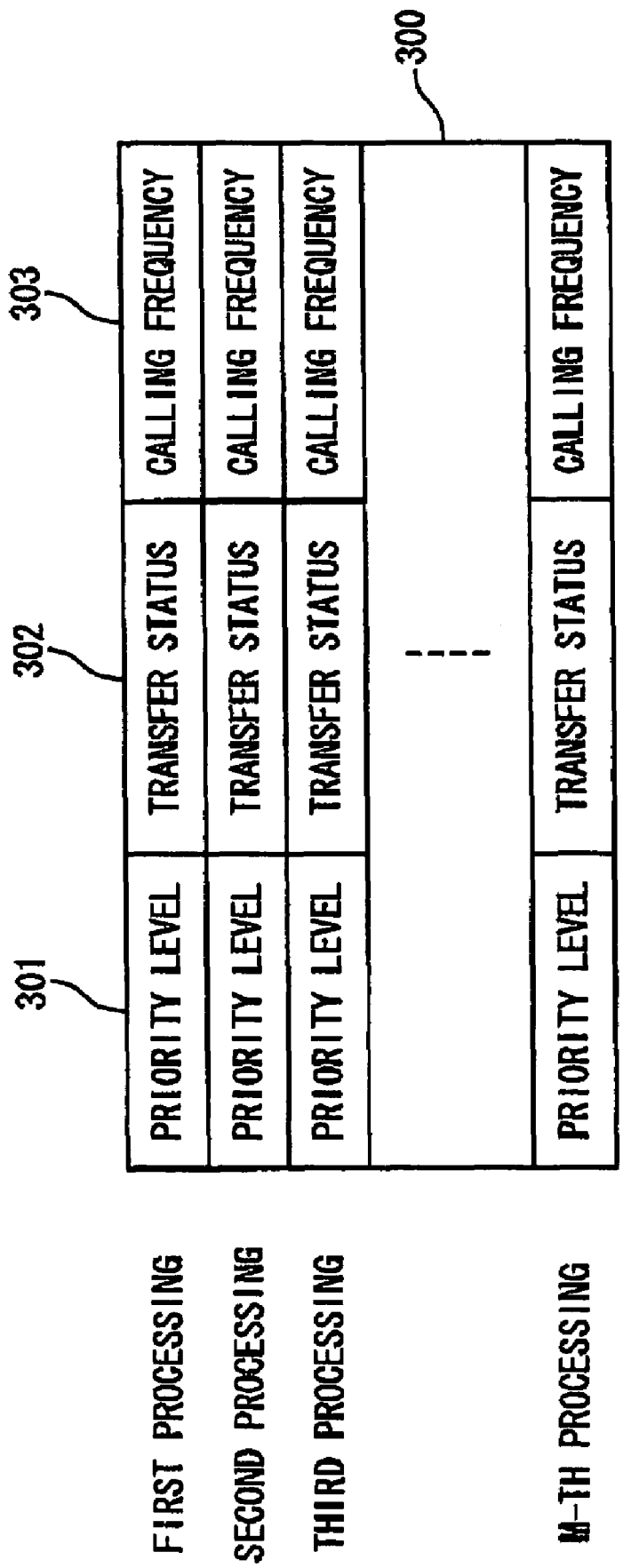

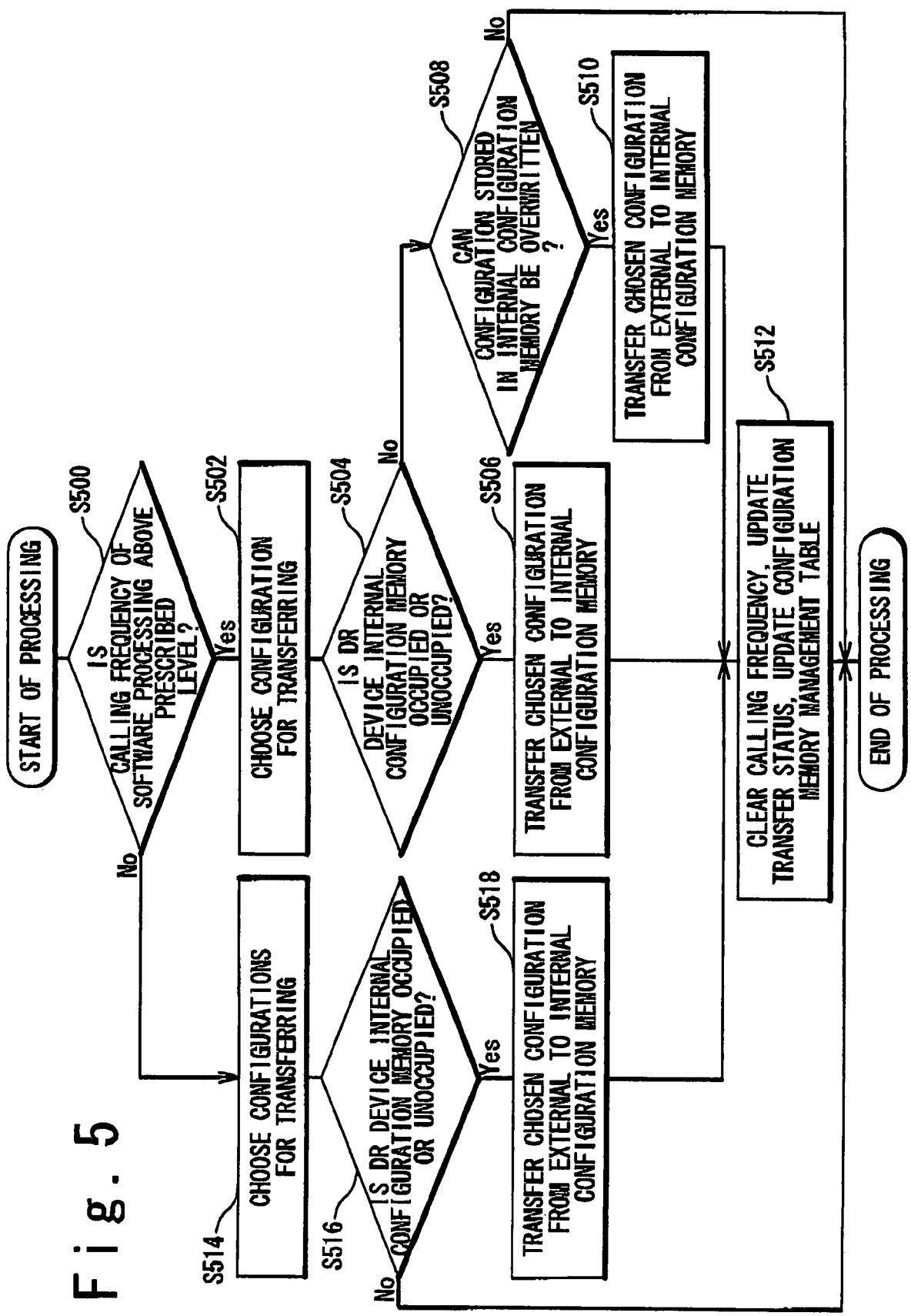

CONFIGURATION MANAGING DEVICE FOR A RECONFIGURABLE CIRCUIT

BACKGROUND OF THE INVENTION

1. Field of the Invention

The present invention relates to a computer processing. More particularly, the present invention relates to a processing in which processes are performed by a reconfigurable logic circuit.

2. Description of the Related Art

In recent years, the communication speed of computer networks has been enhanced. The performance of the processor is a bottleneck for the speed up of the network. For solving the bottleneck problem, the technique for speeding up processing by offloading the processing of coding or protocol stack which is conventionally performed in processor is known. For example, in encoding and decoding processing, a method is disclosed in the following online content: "Product Lineup_64-Bit VR Series", NEC Electronics Corporation, of Jul. 28, 2005.

In this method, an encoding-decoding dedicated hardware is connected to a bus of a processor and the dedicated hardware is called in the encoding-decoding processing in software processing. Also, a method in which a circuit dedicated for encoding and decoding processing is incorporated in a processor is disclosed in the following online content:

"AES Cipher Engine", Techno Create, of Jul. 28, 2005.

However, the functions which are processed by the hardware block offloaded from central processing unit for achieving higher speed are fixed and cannot be changed. As a result, the variety of processes whose speeds can be made faster in the hardware is limited so that the application to the variety of processes is restricted. Also, there is a case that the kinds of the processes whose speed is desired to be made faster is different depending on the kind of data inputted to the processor. In that case, the effect cannot be achieved enough in the hardware performing a fixed function, so that the speed of the process is not necessarily improved.

For solving these problems, the dynamically reconfigurable circuit is known which changes the offloaded hardware circuit during the processing and executes the wide variety of processes.

As a publicly known technique, Japanese Laid Open Patent Application (JP-P 2003-208305A) discloses a data processing device that reduces the influence of the time required for the dynamic circuit restructuring on the processing performance.

In the data processing device disclosed in the patent document 1, in the data processing, in parallel to a process that is carried out on CPU and using a first memory and a third memory, a controlling unit carries out a process for structuring a reconfigurable logic circuit in accordance with a content of a restructuring information memory. Then, after finishing the structuring of the reconfigurable logic circuit, instead of the CPU, the reconfigurable logic circuit carries out a process by using the second memory and the third memory.

However, the storage region for storing the information used in restructuring the circuits is limited. When there are a large variety of processes that are desired to be executed through the restructured hardware, it is necessary to enhance the restructuring information memory or use an external memory for holding the restructuring information (configuration data) necessary for restructuring. In the case that the restructuring information memory is enhanced, a circuit area becomes larger and the cost is increased. Also, in the case that the external memory is used for storing the configuration data used for restructuring, it takes a time to transfer the configuration data, and the process time becomes long, which results in the drop in the process performance.

Further conventional techniques are described below. Japanese Laid Open Patent Application (JP-P 2001-067212A) discloses a trouble avoidance information processing system which transfers structure information and a micro command in an external storage device to a main storage device when an information processing system is started and then executes a starting process in accordance with the structure information.

Japanese Laid Open Patent Application (JP-A-Heisei, 4-042342) discloses a bus arbitration circuit which holds bus use request signals form data transfer modules and determines the priorities of the bus use requests from the data transfer modules and permits the use in accordance with the priorities.

Japanese Laid Open Patent Application (JP-A-Heisei, 11-085608) discloses a computer system which divides memory into several groups and gives priorities to assign the memories to the respective groups and then assigns an area in order from the group having a higher priority in response to the assignment request of the memory.

SUMMARY OF THE INVENTION

It is therefore an object of the present invention to provide a data processing device, a data processing method and a data processing program, which can make processing performed in processor faster by small hardware resources.

A data processing device according to the present invention includes: a processing unit configured to recognize whether a given process belongs to a first category or a second category, to execute the given process when the given process belongs to the first category, and to issue an execution request of the given process when the given process belongs to the second category, and a dynamically reconfigurable device configuring a reconfigurable circuit to be adaptive to execute the given process in response to the execution request and executing the given process by the reconfigurable circuit.

Preferably, the dynamically reconfigurable device includes an internal configuration memory storing internal configuration items each of which corresponds to a possible configuration of the reconfigurable circuit adaptive to execute a specific process. The processing unit recognizes said given process to belong to the second category when the internal configuration items includes an item corresponding to the given process.

More preferably, the data processing device further includes: an external configuration memory for storing external configuration items each of which corresponds to a possible configuration of the reconfigurable circuit adaptive to execute a specific process, wherein priorities are associated to the respective external configuration items; and a configuration controlling unit selecting an item to which a priority higher than a predetermined level is associated from the external configuration items as a selected item and to send the selected item to the internal configuration memory to add to the internal configuration items.

More preferably, the data processing device further includes: an external configuration memory for storing external configuration items each of which corresponds to a possible configuration of the reconfigurable circuit adaptive to executed a specific process, wherein a calling frequency of the specific process is recorded with each of the external configuration items; and a configuration controlling unit selecting an item the calling frequency thereof is higher than a predetermined level from the external configuration items as a selected item and to send to the selected item to the internal configuration memory to add to the internal configuration items.

More preferably, the data processing device further includes: a bus connecting the processing unit and the dynamically reconfigurable device; and a bus monitoring unit monitoring an access to the dynamically reconfigurable device through the bus. The processing unit recognizes whether the given process belongs to the first category or the second category based on a monitoring of the access by the bus monitoring unit.

A data processing method according to the present invention includes: recognizing whether a given process belongs to a first category or a second category; executing the given process when the given process belongs to the first category; generating an electrical signal for issuing an execution request of the given process when the given process belongs to the second category; and configuring a reconfigurable circuit to be adaptive to execute the given process in response to the execution request and executing the given process by the reconfigurable circuit.

A computer-readable software product according to the present invention is adaptive to realize the method according to the present invention.

According to the data processing device, the data processing method and the data processing program based on the present invention, it is possible to make the processes performed in processor faster by small hardware resources.

BRIEF DESCRIPTION OF THE DRAWINGS

FIG. 1 is a block diagram showing a structure in the first embodiment of a data processing device;

FIG. 2 is a block diagram showing a structure in the second embodiment of the data processing device;

FIG. 3A is an example of a structure of a process management table according to the present invention;

FIG. 5 is a flow chart showing operations of a configuration management and transfer process in a data processing device according to the present invention.

DESCRIPTION OF THE PREFERRED EMBODIMENTS

Figure 3B:
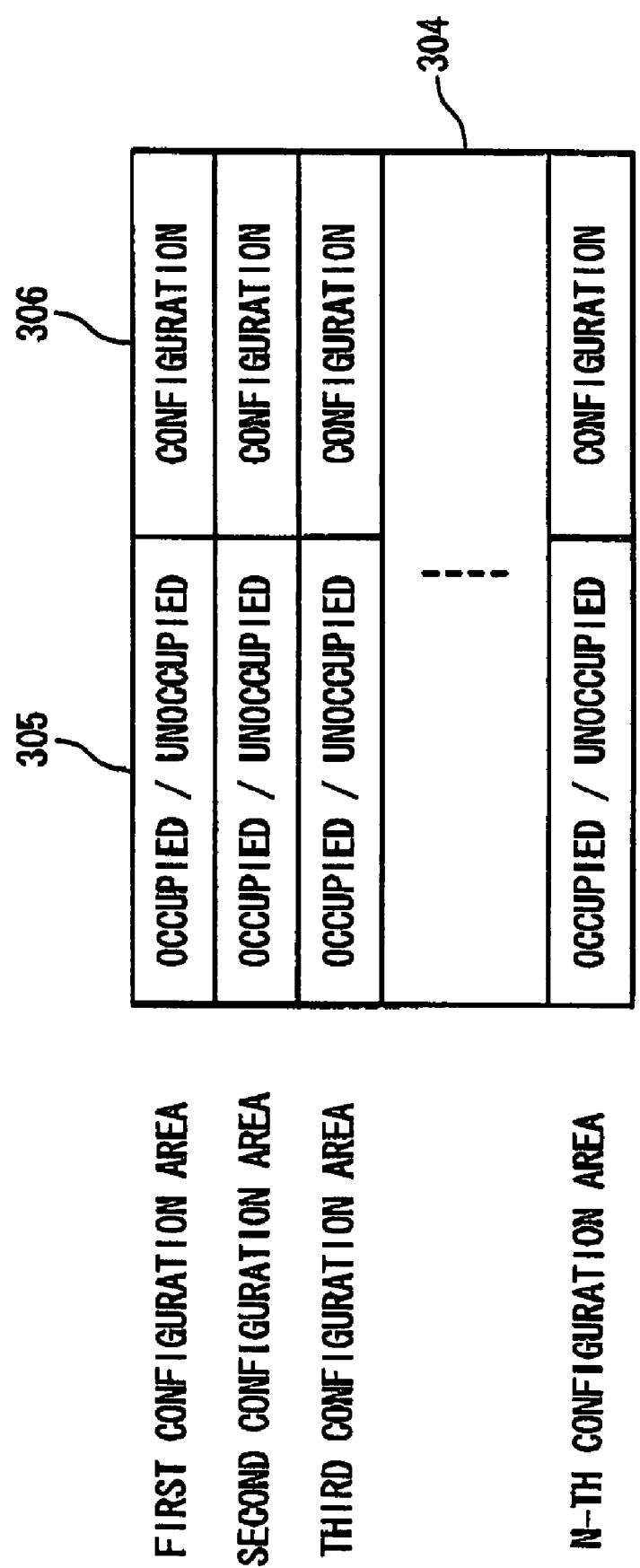
FIG. 3B is an example of a structure of a configuration memory management table according to the present invention.

The embodiments of the data processing device according to the present invention will be described below with reference to the attached drawings. On the drawings, the elements having same reference number indicate the same, similar or equivalent components.

At first, the first embodiment is explained below.

[Structure]

FIG. 1 is a block diagram showing the structure of the data processing device in the first embodiment of the present invention. The data processing device according to the present invention contains: an I/O (input and output) processing unit 104 for carrying out the input and output processes of data which is the object to be processed; a processing unit 100 for processing the input data; a dynamically reconfigurable device 107 including a dynamically reconfigurable circuit that can switch over the circuit configuration while switching the circuit at an order of some tens of nano-second; an external configuration memory 111 for storing a setting information (configuration data) to change the structure of the dynamically reconfigurable circuit; and a configuration controlling unit 105 for transferring the content stored in the external configuration memory 111 to the dynamically reconfigurable device 107. Those devices are connected through a bus 113 to each other. The bus is realized by a local bus of the processor or a standard bus like PCI (Peripheral Components Interconnect bus). As the I/O processing unit 104, for example, the Ethernet (registered trademark) device in a network device can be used.

The processing unit 100 is provided with: a first processing section 101-1 to an n-th processing section 101-$n$ for executing the processes that are not executed by the dynamically reconfigurable device 107; a configuration managing section 103 for managing a usage history of the configuration (a record of processes executed in the dynamically reconfigurable device 107) and a usage priority level inside the external configuration memory 111, a current usage state of the configuration in the dynamically reconfigurable device 107, and the like; and an offloading process determining section 102 which, when the data inputted from the I/O processing unit 104 is processed, determines whether or not it can be processed by the dynamically reconfigurable device 107, in accordance with the management information of the configuration managing section 103.

The dynamically reconfigurable device 107 is provided with: a dynamically reconfigurable block 108 that can switch the procedure of data processing by changing the circuit configuration; and an internal configuration memory 109 for storing configuration items each of which corresponds to a possible configuration of the dynamically reconfigurable block 108 and includes information for configuring the circuit structure to be one of possible configurations. The dynamically reconfigurable block 108 contains: a reconfiguration controller (not shown in the drawings) for changing the circuit structure in accordance with the configuration item inside the internal configuration memory 109 and is specified by the processing unit 100; and a dynamically reconfigurable circuit (not shown in the drawings) whose circuit structure is changed by the reconfiguration controller. The internal configuration memory 109 has the first configuration area 110-1 for storing a first configuration item corresponding to a process 1 to the m-th configuration area 110-$m$ for storing an m-th configuration item corresponding to a process m, and a maximum of m configuration items are stored while correlated to the respective processes. Preferably, the identifiers which are correlated with each of the m configuration items are stored and identify the procedures executed by the respective configurations. By using the configuration items stored in the internal configuration memory 109, the reconfiguration controller can switch the dynamically reconfigurable block 108 at the order of tens of nano second.

The external configuration memory 111 has memory areas that can store n (>m) configuration items, The respective areas preferably store a first configuration item 112-1 to an n-th configuration item 112-$n$ which correspond to the respective n procedures of data processing that can be executed by the dynamically reconfigurable device 107. Preferably, the configuration indexes showing the processing meaning (or the identifiers for identifying the respective configurations) and being correlated with each of the n configuration items are stored in the external configuration memory 111. The configuration controlling unit 105 responds to the transfer request from the configuration managing section 103 inside the processing unit 100 and transfers the configuration item stored in the external configuration memory 111 to the internal configuration memory 109 in accordance with the usage frequency recorded in the configuration management table 300. The configuration controlling unit 105 can be realized, for example, by using DMAC (Direct Memory Access Controller).

The configuration managing section 103 contains: the process management table 300 for managing the process record (process history), such as a history recording the transfer event to the internal configuration memory 109 from the external configuration memory 111, a usage frequency and a priority level; and a configuration memory management table 304 for managing the usage record of the configuration area inside the internal configuration memory 109.

FIG. 3A is a diagram showing the data structure of the process management table 300 according to the present invention. With reference to FIG. 3A, the process management table 300 records: priority levels 301 which are used for executing the processes in the dynamically reconfigurable device 107; transfer statuses 302 indicating whether or not each of the configuration items is stored in the internal configuration memory 109; and calling frequencies 303 of each of the processes called from the processing unit 100. The priority levels, transfer statuses and the calling frequencies are corresponding to each of the n-th processes stored in the external configuration memory 111.

FIG. 3B is a diagram showing the data structure of the configuration memory management table 304 according to this embodiment. With reference to FIG. 3B, the configuration memory management table 304 records: occupied/unoccupied status 305 of the respective configuration areas 110-1 to 110-$m$ in the internal configuration memory 109; and information (configuration content) 306 by which the content of the process corresponding to the configuration stored in the configuration area under use can be recognized. The configuration content information 306 may be the identifiers to identify the configurations or may be the information correlated to the identifiers.

[Operation]

Figure 4:
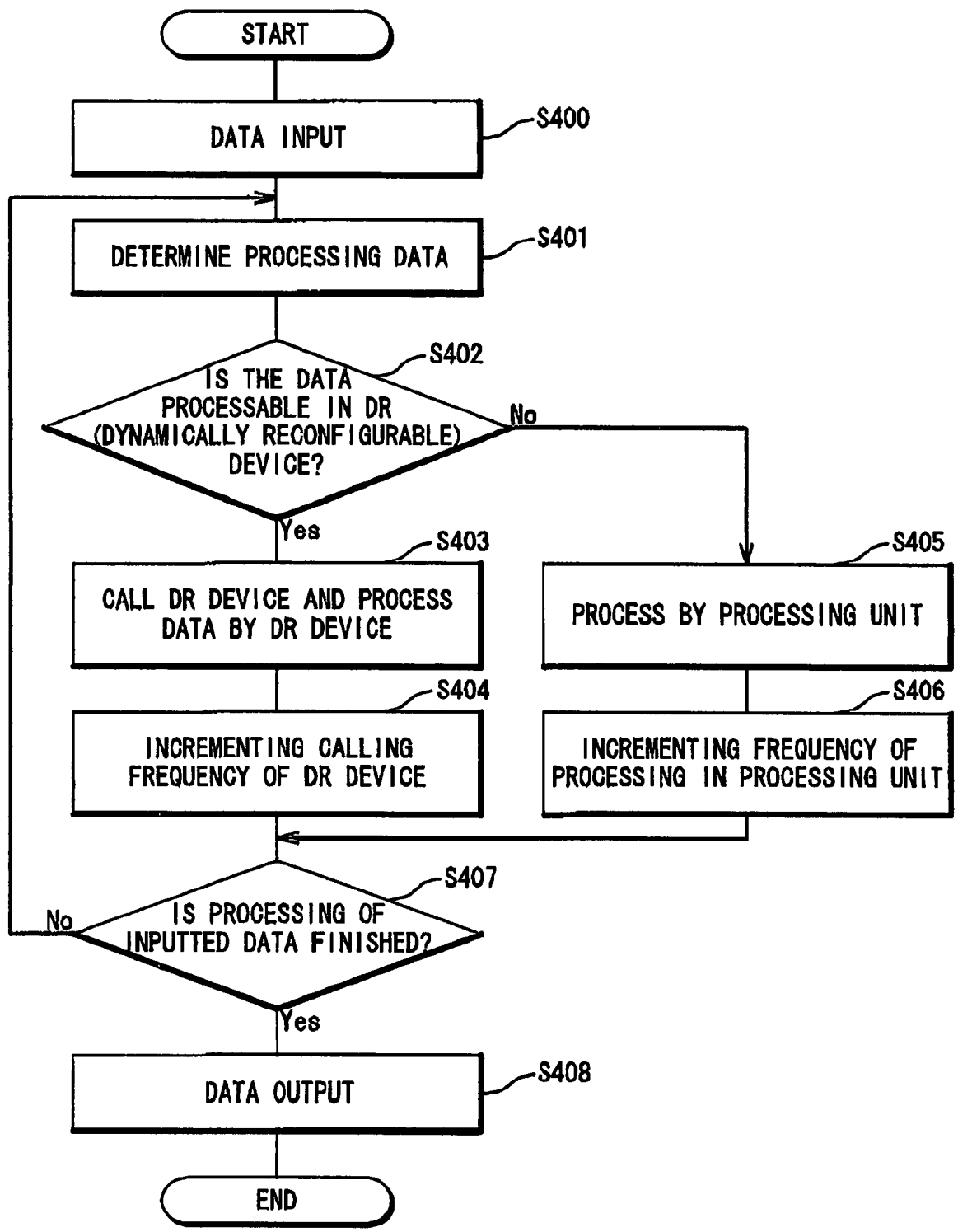
FIG. 4 is a flow chart showing operations of a data process in a data processing device according to the present invention.

With reference to FIGS. 4, 5, the operations of the data processing and the configuration management processing in the embodiment of the data processing device according to the present invention will be described below. In the following explanation, the case that the first process and the second process are performed on the received data is explained.

[Data Processing Operation]

FIG. 4 is a flowchart showing the operation of the data processing device according to this embodiment. With regard to FIG. 4, the data received by the I/O processing unit 104 is stored in the memory 106. The I/O processing unit 104 reports the reception of the data to the processing unit 100 (Step S400).

The processing unit 100 responds to a data in the program counter (not shown in the drawings) incorporated in the processing unit 100 and issues a command (call command) to perform the first process on the received data to the offloading process determining section 102 (Step S401). The offloading process determining section 102 receives the call command, refers to the process management table 300 managed by the configuration managing section 103 and recognizes whether the given first process belongs to a first category or a second category. When the process is recognized to belong to the first category, the process is to be executed by the first processing nit 100. When the process is recognized to belong to the second category, the process is to be executed by the dynamically reconfigurable device 107 (Step S402). In detail, the offloading process determining section 102 refers to the transfer status 302 corresponding to the first process on the process management table 300 and checks whether or not the configuration item corresponding to the first process is already transferred to and stored in the internal configuration memory 109 of the dynamically reconfigurable device 107.

At the step S402, if the transfer status 302 corresponding to the first process is "Transferred", namely, if the first process can be executed by the dynamically reconfigurable device 107 (Step S402, Yes), the configuration corresponding to the first process of the internal configuration memory 109 is applied to the dynamically reconfigurable block 108, the reconfiguration is executed and the first process is executed by the reconfigured circuit (Step S403). In detail, the offloading process determining section 102 issues a command of execution request of the first process together with the identifier of the configuration corresponding to the first process to the dynamically reconfigurable device 107. The dynamically reconfigurable block 108 of the dynamically reconfigurable device 107 that receives the command and the identifier of the configuration extracts the configuration item corresponding to the identifier from the internal configuration memory 109 and reconfigures the dynamically reconfigurable circuit by using the extracted configuration item and then performs the first process on the data stored in the memory 106. The dynamically reconfigurable device 107, when completing the first process, stores the execution result in the memory 106 and reports the process completion to the processing unit 100.

When the report of the process completion with regard to the first process is received from the dynamically reconfigurable device 107, the configuration managing section 103 of the processing unit 100 updates the reconfiguration record by incrementing the calling frequency 303 of the process management table 300 (adds the calling frequency to the first process by 1) (Step S404).

At the step S402, if the transfer status 302 corresponding to the first process is "Not Transferred", namely, if the first process cannot be executed by the dynamically reconfigurable device 107 (Step S402: No), the process is executed by the first processing section 101-1 corresponding to the first process in the processing unit 100 (Step S405). The first processing section 101-1, when completing the first process, stores the execution result in the memory 106 and reports the process completion to the configuration managing section 103.

When the report of the process completion with regard to the first process is received from the first processing section 101-1, the configuration managing section 103 updates the reconfiguration record by incrementing the calling frequency 303 of the process management table 300 (adds the calling frequency for the first process by 1) (Step S404).

The processing unit 100 determines whether or not the all of the processes for the received data have been completed (Step S407). Since the execution of the second process is supposed to be required in this explanation, the processing unit 100 responds to a data in the program counter (not shown in the drawings) and issues the command (call command) to perform the second process on the received data to the offloading process determining section 102 (Step S401). The description of the flow with regard to the second process is omitted because it is similar to the flow with regard to the first process. At the step S407, if there is no more process to be executed, the process for the received data is completed, and the process result is transmitted through the I/O processing unit 104 to the external device (Step S408).

As mentioned above, the data processing device according to this embodiment recognizes whether or not the process can be executed in the dynamically reconfigurable device 107 for each process to be performed on the data inputted to the processing unit 100. Then, the process is executed in the dynamically reconfigurable device 107 if the configuration item registered in the dynamically reconfigurable device 107 can be used to change the structure for processing the data. That is, the configuration items inside the dynamically reconfigurable device 107 are used to change the structure of the dynamically reconfigurable block 108 and carry out the process. Thus, the process can be executed at the higher speed than that of the structure in which the external configuration items are used.

The histories of the processes executed in the processing unit 100 and dynamically reconfigurable device are recorded as the calling frequency 303. Thus, the configuration managing section 103 can manage the high usage frequency processes.

{Configuration Management and Transfer Process Operation}

In the dynamically reconfigurable device 107, when a configuration to be set is registered in the internal configuration memory 109, the reconfigurable circuit is changed to the configuration at high speed. However, if when a configuration to be set is not registered in the internal but in the external configuration memory 111, the change of reconfigurable circuit to the configuration is slow. Under this condition, the configuration managing section 103 stores the configuration item corresponding to the process desired to be done at the high speed in the internal configuration memory 109. Thus, in accordance with the information inside the process management table 300, the configuration memory management table 304 is updated and managed to control the transfer of the configuration item.

FIG. 5 is a flowchart showing the operations of the configuration management and transfer process performed by the data processing device according to this embodiment. The operations of the configuration management and transfer process to be carried out by the configuration managing section 103 will be described below with reference to FIG. 5.

The configuration managing section 103 refers to the calling frequency 303 stored in the process management table 300 and monitors whether or not there is a process whose frequency of calling is equal to or greater than a defined threshold frequency (Step S500). This monitoring may be executed for every constant time or may be executed for every execution of the data process.

At the step S500, if the process having the calling frequency equal to or greater than the defined frequency is not recorded in the process management table 300, the configuration item corresponding to the process to be executed in the dynamically reconfigurable device 107 is selected as the configuration item of a transfer candidate, from all of the processes managed by the process management table 300 (Step S514). For example, the configuration item corresponding to the process that has the high priority (the priority equal to or higher than a threshold or the highest priority) and has large calling frequency (the largest calling frequency) is selected as the configuration item of the transfer candidate. Next, the usage state of the internal configuration memory 109 is checked by referring to the configuration memory-management table 304 (Step S516). In detail, whether or not the configuration item is stored in each area is checked by referring to a flag 305 indicating the occupied/unoccupied status for the first configuration area 110-1 to the m-th configuration area 110-m in the internal configuration memory 109. If there is the unoccupied area (Step S516: Yes), the configuration managing section 103 specifies the unoccupied configuration area for the configuration controlling unit 105 and issues the transfer request of the configuration item. At this time, the identifier to identify the configuration item of the transfer candidate is transmitted to the configuration controlling unit 105. The configuration controlling unit 105 responses to the transfer request, extracts the configuration item corresponding to the identifier of the configuration item of the transfer candidate from the external configuration memory 111 and transfers to and'stores in the specified configuration area (Step S518). If there is not the unoccupied area at the step S516 (Step S516: No), the configuration management process is finished.

At the step S500, if the process having the calling frequency equal to or greater than the defined frequency is recorded in the process management table 300, the configuration item corresponding to the process is selected as the configuration item of the transfer candidate (Step S502). If there are more than two configuration items corresponding to the processes having the calling frequency equal to or greater than the defined frequency, the plurality of configuration items may be selected as the transfer candidates. Next, the usage state of the internal configuration memory 109 is checked by referring to the configuration memory management table 304 (step S506). In detail, whether or not the configuration is stored in each area is checked by referring to the flag 305 indicating the occupied/unoccupied for the first configuration area 110-1 to the m-th configuration area 110-m in the internal configuration memory 109. If there is the unoccupied area (Step S504: Yes), the configuration managing section 103 reports the unoccupied configuration area for the configuration controlling unit 105 and issues the transfer request of the configuration item. At this time, the identifier to identify the configuration item of the transfer candidate is transmitted to the configuration controlling unit 105. The configuration controlling unit 105 responses to the transfer request, extracts the configuration item corresponding to the identifier of the configuration item of the transfer candidate from the external configuration memory 111 and transfers to and stores in the specified configuration area (Step S506).

At the step S504, if there is not the unoccupied area in the internal configuration memory 109 (Step S504: No), or if in the case of Yes of the step 504 and the number of the configuration areas specified as the areas to which the data are transferred is less than the number of the configuration items of the transfer candidates, the configuration managing section 103 specifies a rewritable areas inside the internal configuration memory 109 and transfers the configuration items as the transfer candidates to the areas. The configuration managing section 103 refers the process management table 300, selects the rewritable configuration item (Step S508) which can be processed by the dynamically reconfigurable device (it can be checked by the transfer status 302) and the overwrite to which is permitted. For example, the configuration item having the low priority and the calling frequency equal to or less than a certain threshold value is judged to be rewritable. The configuration managing section 103 issues the identifier of the configuration item, which is judged to be rewritable, together with a rewrite request to the configuration controlling unit 105. The configuration controlling unit 105 responds to the rewrite request and transfers the configuration item as the transfer candidate to a configuration area 110 in which the rewritable configuration item is stored, and overwrites the configuration item data in the area (Step S510). In detail, the configuration controlling unit 105 refers to the configuration memory management table 304 and retrieves the configuration area, in which the rewritable configuration item is stored, from the configuration content information 306 corresponding to (or coincident with) the identifier of the configuration item judged to be rewritable (which means the overwrite to the memory area storing the configuration item is permitted). Then, the configuration item coincident with the identifier of the configuration item as the transfer candidate is extracted from the external configuration memory 111 and transferred to the configuration area 110 in which the rewritable configuration item was stored, and the configuration item is overwritten.

At the steps S506, S510 and S518, when the configuration item is transferred from the external configuration memory 111 to the internal configuration memory 109, the configuration managing section 103 changes the transfer status 302 of the process management table 300 so as to indicate that the configuration has turned to be processable in the dynamically reconfigurable device 107, and clears the calling frequency 303. In detail, the configuration managing section 103 sets the flag of the transfer status 302 of the process corresponding to the identifier of the transferred configuration item to "Transferred" and then sets the calling frequency 303 to 0. Also, an occupied/unoccupied information 305 of the corresponding area is changed to the "occupied" state, and the index showing the meaning of the process (or the identifier of the configuration) corresponding to the transferred configuration item is stored in the configuration content information 306, and it is updated (Step S512).

As mentioned above, the configuration managing section 103 in the processing unit 100 according to this embodiment can manage the configurations item transferred to the dynamically reconfigurable device 107. Also, data of the configuration item having the high priority or high calling frequency can be preferentially transferred to the dynamically reconfigurable device 107. Thus, the frequency that the configuration item to be used is read from the external configuration memory 111 becomes small so that the process speed in the dynamically reconfigurable device 107 can be improved.

Next, the second embodiment of the data processing device according to the present invention will be described below with reference to FIG. 2.

[Structure]

FIG. 2 is a block diagram showing the structure in the second embodiment of the data processing device according to the present invention. The structure of the data processing device in the second embodiment is the structure where the function corresponds to the configuration managing section 103 in the first embodiment is installed outside the processing unit. That is, the data processing unit in the second embodiment executes the configuration management process and the configuration transfer control process according to the transfer of the configuration item outside the processor. With reference to FIG. 2, the data processing device in the second embodiment contains: the I/O processing unit 104 for carrying out the input/output process of the data to be processed; a processing unit 200 for executing the process of the input data; the dynamically reconfigurable device 107 including the dynamically reconfigurable circuit that can execute the circuit configuration while switching it at the order of tens of nano-second; the external configuration memory 111 for storing the setting information (configuration data) to change the structure of the dynamically reconfigurable circuit; and a configuration control block 202 for carrying out the configuration management and the transfer control to transfer the data stored in the external configuration memory 111 to the dynamically reconfigurable device 107. Those respective devices are connected through the bus 113 to each other. Here, the structures of the same symbols as the first embodiment have the same operations and configurations which are explained in the first embodiment. Thus, their explanations are omitted.

The processing unit 200 is provided with: the first processing section 101-1 to the n-th processing section 101-*n* for executing the process that is not be executed by the dynamically reconfigurable device 107; and an offloading process determining section 201 which, when the data inputted from the I/O processing unit 104 is processed, determines whether or not it can be processed by the dynamically reconfigurable device 107, in accordance with the management information obtained from the configuration control block 202.

The configuration control block 202 is provided with: a configuration managing section 203 for managing a usage history and the usage priority level of the configuration item (the processing history in the dynamically reconfigurable device 107) in the configuration memory 111 and the current usage state of the configuration item in the dynamically reconfigurable device 107; a bus monitoring section 204 for monitoring the bus 113 for monitoring the calling state of the configuration item in the dynamically reconfigurable device 107; and a configuration controlling unit 205 for determining the transfer of the configuration item in accordance with the information from the processing unit 200 (the offloading process determining section 201) and the configuration managing section 203, and carrying out the transfer process as necessary.

[Operation]

[Data Processing Operation]

With reference to FIG. 4, the data process in the second embodiment is similar to the first embodiment, except that an inquiry is performed on the configuration control block 202, when the offloading process determining section 201 determines whether or not it can be processed in the dynamically reconfigurable device 107, at the step S402 explained in the first embodiment. In detail, the configuration managing section 203 in the configuration control block 202 that receives the inquiry from the offloading process determining section 201 transmits the transfer status 302 corresponding to the specified process in the process management table 300 to the offloading process determining section 201. The offloading process determining section 201 refers to this transfer status 302 and determines whether or not it can be executed in the dynamically reconfigurable device 107.

[Configuration Management and Transfer Process Operation]

With reference to FIG. 5, the configuration management and transfer process in the second embodiment is similar to the first embodiment, except that the operation when the configuration managing section 203 updates the process management table 300 is different, at the step S512 explained in the first embodiment. In detail, when the configuration managing section 203 updates the calling frequency 303 of the process management table 300, if the process is executed in the processing unit 200, the calling information of the process is updated in accordance with the report from the processing unit 200, and if the process is executed in the dynamically reconfigurable device 107, the calling information of the process is updated in accordance with the information collected by a bus monitoring function of the bus monitoring section 204.

In this way, in the data processing device in the second embodiment, the management block of the configuration is installed outside the processor. Thus, the configuration management process that was conventionally executed by the processor process can be executed outside, thereby reducing the load on the processor.

As mentioned above, the data processing device according to the various embodiments of the present invention, while switching the circuit structure of the dynamically reconfigurable device, executes the process and further responds to the calling frequency of the process and the priority, the configuration data stored in the external configuration memory is transferred to the configuration memory of the dynamically reconfigurable device. As a result, the higher speed of the process can be achieved by using a restricted hardware resource in the process of the input data. Also, the function for transferring the configuration data to the configuration memory of the dynamically reconfigurable device from the external configuration memory on the basis of the calling frequency of the process and the priority is installed outside the processor. Thus, the load on the processor can be reduced.

As mentioned above, although the embodiments of the present invention have been described in detail, the specific structures and operations are not limited to the above-mentioned embodiments. Even the change within the range without departing the intent and scope of the present invention is included in the present invention.

What is claimed is:

1. A data processing device, comprising:
  a processing unit configured to recognize whether a given process belongs to a first category or a second category, to execute said given process when said given process belongs to said first category, and to issue an execution request of said given process when said given process belongs to said second category;
  a dynamically reconfigurable device comprising a reconfigurable circuit configured to be capable of being adapted to execute said given process in response to said execution request and said reconfigurable circuit executes said given process;
  an internal configuration memory provided in said dynamically reconfigurable device configured to store internal configuration items, each internal configuration item corresponding to a possible configuration of said reconfigurable circuit capable of being adapted to execute a specific process, and, when said internal configuration items include an item corresponding to said given process, said processing unit recognizes said given process as belonging to said second category;
  an external configuration memory configured to store external configuration items, each external configuration item corresponding to a possible configuration of said reconfigurable circuit capable of being adapted to execute a specific process, wherein each respective external configuration item has a priority assigned thereto; and
  a configuration controlling unit configured to select an external configuration item having a calling frequency that is higher than a predetermined level from said external configuration items and to send said selected external configuration item to said internal configuration memory to be added to said internal configuration items, wherein said dynamically reconfigurable device is connected to said processing unit via an external bus.

2. The data processing device according to claim 1, wherein priorities are associated to said respective external configuration items, and
  wherein the configuration controlling unit is configured to select an external configuration item having a priority higher than a predetermined level as a selected item and to send said selected item to said internal configuration memory to add to said internal configuration items.

3. The data processing device according to claim 1, further comprising a bus monitoring unit configured to monitor an access to said dynamically reconfigurable device through said external bus,
  wherein information for said calling frequency information is updated in accordance with a monitoring of said access by said bus monitoring unit.

4. The data processing device according to claim 1, wherein the processing unit comprises a process management table configured to record priority levels for executing each one of possible specific processes in the dynamically reconfigurable device, transfer statuses indicating whether each of the internal configuration items is stored in an internal configuration memory, and calling frequencies of each of the specific processes called from the processing unit.

5. The data processing device according to claim 4, wherein each of the priority levels, the transfer statuses, and the calling frequencies corresponds to a respective process stored in said external configuration memory.

6. The data processing device according to claim 4, wherein the internal configuration memory includes configuration areas in which configuration items are stored, and
  wherein the processing unit comprises a configuration memory management table recording an occupied/unoccupied status of said configuration areas in the internal configuration memory and configuration content information.

7. The data processing device according to claim 6, wherein the configuration content information comprises identifiers of the possible configurations.

8. The data processing device according to claim 6, wherein the configuration content information comprises information correlated to identifiers.

9. The data processing device according to claim 6, wherein the configuration table comprises a usage frequency for each of the possible configurations.

10. The data processing device according to claim 9, wherein, when a usage frequency of a process is greater than or equal to a predetermined threshold frequency, and, when it is determined that the process having a usage frequency greater than the predetermined threshold frequency is not recorded in the process management table, a configuration item corresponding to a process to be executed in the dynamically reconfigurable device is selected as a configuration item of a transfer candidate, from all of the processes managed in the process management table.

11. The data processing device according to claim 9, wherein, when said usage frequency of a process is lower than a predetermined threshold frequency, said process is not recorded in the process management table.

12. The data processing device according to claim 11, wherein, when it is determined that the process having the usage frequency greater than the predetermined threshold frequency is recorded in the process management table, a configuration item corresponding to a process to be executed in the dynamically reconfigurable device is selected as a configuration item of a transfer candidate.

13. A data processing method, comprising:
  recognizing, using a processor on a computer, whether a given process belongs to a first category or a second category;

executing said given process when said given process belongs to said first category;

generating an execution request of said given process when said given process belongs to said second category;

configuring a reconfigurable circuit to be adaptive to execute said given process in response to said execution request and executing said given process by said reconfigurable circuit;

storing internal configuration items in an internal configuration memory, each of said internal configuration items corresponding to a possible configuration of said reconfigurable circuit capable of being adapted to execute a specific process;

recognizing that said given process belongs to said second category when said internal configuration items include an item corresponding to said given process;

storing external configuration items in an external configuration memory, each of said external configuration items corresponding to a possible configuration of said reconfigurable circuit capable of being adapted to execute said specific process, wherein a calling frequency of said specific process is recorded with each of said external configuration items;

selecting an item having a calling frequency higher than a predetermined level from said external configuration items as a selected item; and sending said selected item to said internal configuration memory to add to said internal configuration items, wherein said reconfigurable circuit is connected to a processing unit via an external bus.

14. The data processing method according to claim 13, wherein priorities are associated to said external configuration items, and wherein an item having a priority level higher than a predetermined level from said external configuration items are selected as a selected item and said selected item is sent to said internal configuration memory to add to said internal configuration items.

15. The data processing method according to claim 13, further comprising monitoring an access to said dynamically configurable device via said external bus connecting a processing unit configured to execute said given process when said given process belongs to said first category and said dynamically reconfigurable device, wherein calling frequency information is updated based on said monitoring.

16. A non-transitory medium storing a set of computer-readable instructions for realizing a data processing method to reconfigure a reconfigurable circuit, as executed by a processor, wherein said method comprises:

recognizing, using a processor on a computer, whether a given process belongs to a first category or a second category;

executing said given process when said given process belongs to said first category;

generating an execution request of said given process when said given process belongs to said second category;

configuring a reconfigurable circuit to be adaptive to execute said given process in response to said execution request and executing said given process by said reconfigurable circuit;

storing internal configuration items in an internal configuration memory, each of said internal configuration items corresponding to a possible configuration of said reconfigurable circuit capable of being adapted to execute a specific process;

recognizing said given process as belonging to said second category when said internal configuration items include an item corresponding to said given process;

storing external configuration items in an external configuration memory, each of said external configuration items corresponding to a possible configuration of said reconfigurable circuit capable of being adapted to execute said specific process, wherein a calling frequency of said specific process is recorded with each of said external configuration items;

selecting an item having a calling frequency higher than a predetermined level from said external configuration items as a selected item; and sending said selected item to said internal configuration memory to add to said internal configuration items, wherein said reconfigurable circuit is connected to a processing unit via an external bus.

* * * * *